(12) United States Patent
Clendening et al.

(10) Patent No.: US 8,688,479 B1
(45) Date of Patent: Apr. 1, 2014

(54) SYSTEMS AND METHODS FOR PROVIDING AN ANNUITY

(75) Inventors: Kristy Lynn Clendening, San Antonio, TX (US); Martin Noel De La Torre, San Antonio, TX (US); Lori Ann Holmes, Seguin, TX (US); David Richard Lilien, Helotes, TX (US); Stephen G. Malfitano, San Antonio, TX (US); Irene Olbera Perez, Floresville, TX (US); Sherry Lynn Rakowitz, Cibolo, TX (US); Kenneth Bruce Ryan, II, San Antonio, TX (US); Sarah Brooke Severson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 162 days.

(21) Appl. No.: 12/234,255

(22) Filed: Sep. 19, 2008

Related U.S. Application Data

(62) Division of application No. 12/129,339, filed on May 29, 2008.

(51) Int. Cl.
*G06Q 40/00* (2012.01)
(52) U.S. Cl.
USPC ............................................................ 705/4
(58) Field of Classification Search
USPC ............................................................ 705/4
See application file for complete search history.

(56) References Cited

U.S. PATENT DOCUMENTS

| 5,631,828 | A | 5/1997 | Hagan |
| 6,636,834 | B1 | 10/2003 | Schirripa |
| 7,912,771 | B2 * | 3/2011 | Young ............................ 705/35 |
| 2001/0034684 | A1 | 10/2001 | Cushing et al. |
| 2002/0133440 | A1 | 9/2002 | Chalke et al. |
| 2003/0004844 | A1 * | 1/2003 | Hueler ........................... 705/35 |
| 2003/0055763 | A1 | 3/2003 | Linnenbringer et al. |
| 2003/0105674 | A1 | 6/2003 | Howell et al. |
| 2003/0187768 | A1 | 10/2003 | Ryan et al. |
| 2004/0122779 | A1 | 6/2004 | Stickler et al. |
| 2007/0244835 | A1 | 10/2007 | Henry |
| 2007/0255637 | A1 * | 11/2007 | Henry ........................ 705/36 R |

OTHER PUBLICATIONS

Hagendorff, Jens et al., "Electronic trading platforms and the cost-effective distribution of open market option (OMO) pension annuities", International Journal of Information Management, vol. 26, Issue 3, Jun. 2006, pp. 187-195.

* cited by examiner

*Primary Examiner* — Hani M Kazimi
*Assistant Examiner* — Hatem M Ali
(74) *Attorney, Agent, or Firm* — Kilpatrick Townsend & Stockton LLP (57) ABSTRACT

A web application may be used to take an on-line application for an annuity. The application may collect the applicant's personal information (e.g., name, address, etc.), type of annuity applied for (e.g., immediate or deferred, retirement or non-retirement, etc.), sources of funding, beneficiaries, etc. The web application may also allow the application to be signed electronically. The web application may take application for annuities that are supported by various different types of back-end systems, and may provide the information collected from the applicant to the appropriate back-end system.

18 Claims, 9 Drawing Sheets

Primary Beneficiary                                                      402

Whom do you want to receive the money when you die?

Name/            Relationship      Dist.
Date of Birth    to owner

Jane Smith -     Spouse            100%       [ Delete ]
  12/04/49

---

Secondary Beneficiary                                                    404

If the primary beneficiary is not alive to receive the money,
whom do you want to receive the money instead?

Name/            Relationship      Dist.
Date of Birth    to owner

[ -- select -- ]                              [ Delete ]

212

[ Previous ] [ Cancel ] [ Save ] [ Next ]

Transfer amount:   $10,000                                          502

Is the amount listed above                                          504
100% of your current account /   ○ Yes   ○ No
contract amount?

Please choose one                                                   506

○ Liquidate and send upon maturity
   ○ Process immediately

Account/contract number:      123456789                             508

Existing IRA Type:            Traditional IRA

Company Name:                 X Insurance Co.

I would like to have the money from my existing                     510
contract sent by ○ check ○ wire

212

[Previous] [Cancel] [Save] [Next]

Personal Information:

Owner/Annuitant Name: John A. Smith

602

Product Information:

Product Name:　　　Single Premium Deferred Savings Annuity
　　Is this an IRA:　　　Yes, IRA
　　IRA Type:　　　　　Traditional

604

Primary Beneficiary Information:

Name:　　　　　　　　Jane Smith
　　Date of Birth:　　　　　12/04/1949
　　Relationship to
　　　annuitant:　　　　　　Spouse
　　Distribution Percentage: 100%

606

Payment Information:

Account/contract
　　　number:　　　　　123456789
　　Existing IRA Type:　　Traditional
　　Transfer Amount:　　$10,000
　　Company Name:　　X Insurance Co.

608

212

[ Previous ] [ Cancel ] [ Save ] [ Next ]

*FIG. 6*

Documents to Electronically Sign:

To complete this transaction online, we must first get your consent to provide documents to you electronically ☐ I have read and agree to the Electronic Document Consent
☐ I acknowledge that I can view and have read each form below
☐ Annuity Application. Please review before signing. This is your completed annuity application.

702

Document                Description

Document-1              <<description>>
Document-2              <<description>>

704

[ Cancel ]  [ Save ]  [ I Agree ]

You have applied for:

Rate           4.40%
You are protected by an interest rate lock for 45 days. We must receive all the forms and your payment within that time.

Product Name:    Single Premium Deferred Savings Annuity

Payment Amount: $10,000

Reference Number:   M239646003

SYSTEMS AND METHODS FOR PROVIDING AN ANNUITY

CROSS-REFERENCE TO RELATED APPLICATIONS

The present application is a divisional patent application of United States patent application Ser. No. 12/129,339 filed May 29, 2008, the entirety of which is hereby incorporated by reference herein. Further, this application is related by subject matter to that disclosed in the following commonly assigned applications, the entirety of which are hereby incorporated by reference herein: U.S. patent application Ser. No. 12/234,239, U.S. patent application Ser. No. 12/234,279, and U.S. patent application Ser. No. 12/234,304, each filed on Sep. 19, 2008, and each entitled "SYSTEMS AND METHODS FOR PROVIDING AN ANNUITY".

BACKGROUND

An annuity is a financial instrument that typically starts with, or accumulates, a fund of money, and then makes recurrent payments to an annuitant or another beneficiary for some term. The term for which payments are made may be a fixed number of year, or until the end of the annuitant's life, or may be defined in some other way. Annuities have long been offered by insurance companies and other financial service institutions.

An annuity normally takes the form of a contract between the financial institution and the annuitant. This contract is generally executed on paper. Moreover, the terms of the contract are generally determined based on a paper application that is completed by the annuitant. An on-line process to apply for and obtain an annuity generally has not been available. Moreover, those on-line applications that support annuities are generally information-gathering applications, in which information is collected from the annuitant and used to fill out fields on a paper contract.

SUMMARY

A web application may allow annuities to be purchased in an on-line process. The web application may collect, from the purchaser, various kinds of information that may be used to issue the annuity. This information may include: personal information (e.g., name, address, age); the type of annuity to be purchased (e.g., deferred or immediate); the amount of money to be used to fund the annuity; whether the annuity is to be a retirement account or a non-retirement account; the primary and secondary beneficiaries of the annuity; or any other information. The web application may provide various types of education concerning the information to be collected, and about annuities in general. For example, the web application may provide a description of the various types of annuities, about how to choose primary and secondary beneficiaries, etc.

Based on the information provided, an annuity contract may be offered. This offer may be made on-line through the web application. The web application may allow the purchaser to accept the terms of the offer with a soft form of assent (e.g., an "electronic signature"). Or, if an ink ("wet") signature is legally called for in a particular circumstance, the web application may cause the appropriate paper to be generated so that a wet signature may be collected by physical mechanisms.

The web application may make the process of applying for annuities on-line relatively uniform, even if different annuities are supported by different back-end systems. For example, one type of annuity may be supported by a system that allows applications to be completed and accepted on-line, while another type of annuity may be supported by a legacy system that involves more human action and/or paper documents. The on-line annuity application process may make these differences in back-end support transparent to the applicant.

This summary is provided to introduce a selection of concepts in a simplified form that are further described subsequently in the detailed description. This summary is not intended to identify key features or essential features of the claimed subject matter, nor is it intended to be used to limit the scope of the claimed subject matter.

BRIEF DESCRIPTION OF THE DRAWINGS

FIG. 1 is a flow diagram of an example process in which an annuity may be applied for.

DETAILED DESCRIPTION

Annuities are financial instruments that are typically been offered by insurance companies and other financial service institutions. The annuity allows the annuitant, and possibly other beneficiaries, to obtain recurring payments for some term, in exchange for front-end funding. Like most financial instruments, annuities traditionally have been offered as paper contracts through a paper application process. The financial industry as a whole has been moving the application and acceptance process to the on-line space for a number of years. However, annuities generally have not been moved to the on-line space. Those on-line processes that exist with respect to annuities are generally information-collection systems, which collect information that may be inserted in a paper form and mailed to a customer for paper execution. The subject matter herein describes mechanisms and techniques that may be used to provide relatively comprehensive annuity services on-line.

Figure 1:
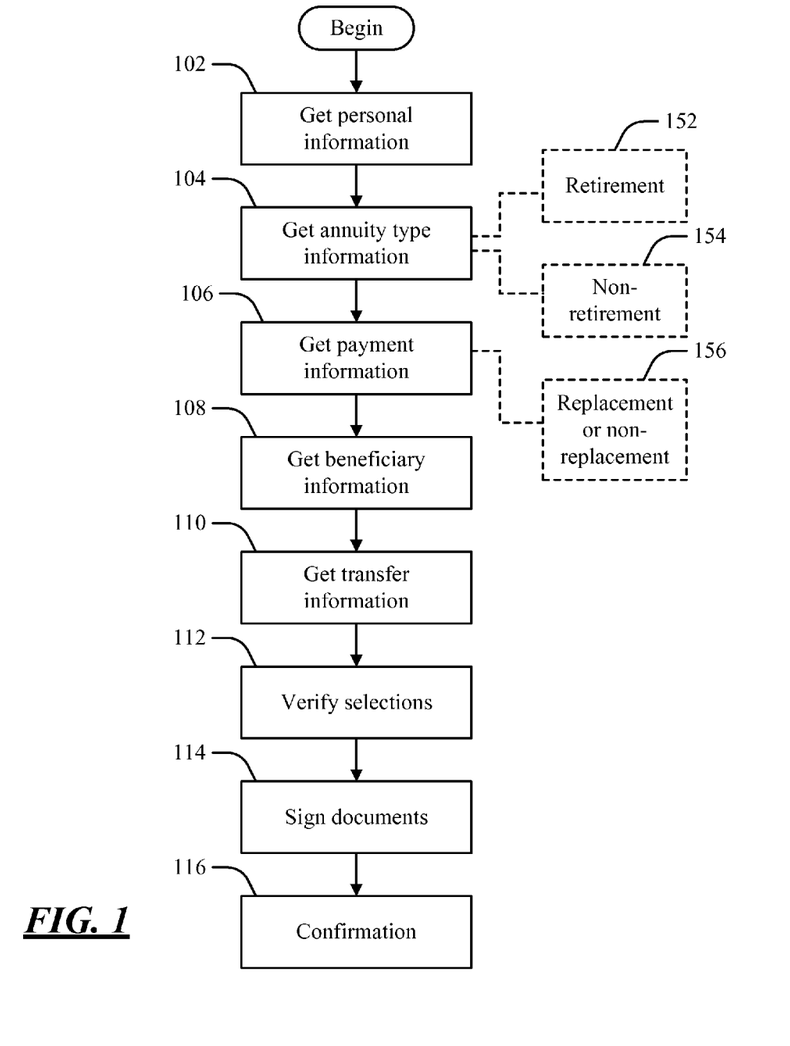

Turning now to the drawings, FIG. 1 shows an example process that may be carried out by a web application to allow a customer to apply for an annuity. It is noted that the process of FIG. 1 may be carried out using components described herein, but could also be carried out in any system. Moreover, FIG. 1 shows an example in which stages of a process are carried out in a particular order, as indicated by the lines connecting the blocks, but the various stages shown in FIG. 1 may be performed in any order, or in any combination or sub-combination.

At 102, personal information related to the annuity applicant is collected. This information may be collected, for example, using an interactive web page, such as that shown in FIG. 2 and described subsequently. The information to be collected may include the applicant's name, mailing address, physical address, telephone number(s), e-mail, and/or any other information.

At 104, annuity type information is collected. For example, the applicant may be asked whether the annuity is for a retirement account (block 152) (e.g., Individual Retirement Account, or "IRA") or for a non-retirement account (block 154). If the applicant indicates that the annuity is for an IRA, the applicant may be asked for the type of IRA (e.g., traditional, Roth, or SEP). In one example, the applicant could be asked information about the financial structure of the annuity to be purchased (e.g., immediate, deferred, or some other type). (The selection of financial structure could also be made in other ways. For example, a financial service web site's annuity page might treat immediate and deferred annuities as different products, where the customer selects different links on the annuity page to apply for each type of product. In this example, the selection of financial structure is made implicitly before the applicant process begins.)

At 106, payment information for the annuity is obtained. For example, the applicant may be asked whether funds are to be obtained as a transfer from another IRA, a rollover, a contribution for the current or prior tax year, etc. The web application may offer different funding options, based on the nature of the annuity. For example, different funding sources may be offered if the annuity is to replace an existing annuity, as compared with what might be offered if the annuity is not a replacement of another annuity (see block 156). As another example, an annuity that is being opened as an IRA may be eligible to receive a transfer from another IRA, but a non-IRA annuity may not be eligible to receive such a transfer. Moreover, the notion of a contribution for a particular tax year may be relevant for retirement accounts, but not for non-retirement accounts. The particular choice of payment/funding options may therefore be based on the nature of the annuity being applied for. (FIG. 3, discussed subsequently, shows an example web page that may be used to collect the information described in connection with 104 and 106.)

At 108, beneficiary information is obtained. For example, the applicant may enter the identities of one or more primary beneficiaries who are to receive the proceeds in the event of the death of the annuitant (the annuitant being the applicant, after the annuity issues). The applicant may also be able to enter one or more secondary beneficiaries if the primary beneficiary(ies) are not alive to receive the money. The applicant may be able to enter a proportion in which the primary beneficiaries are to share the money.

As part of entering beneficiary information, the applicant may be asked to state the beneficiary's relationship to the applicant. The law of some jurisdictions may grant certain rights to a spouse, such as entitling the spouse to beneficiary status unless the spouse explicitly declines. Thus, if the applicant attempts to assign the primary beneficiary as someone other than his or her spouse, this fact may trigger some sort of inquiry to determine whether such assignment of beneficiary is legal in the state where applicant resides or is located, and whether any legal prerequisites have been complied with. For example, if a state calls for the spouse to consent to not being a beneficiary, then a process may be undertaken to obtain the spouses consent before issuing an annuity in which the spouse is not the beneficiary. (FIG. 4, which is discussed subsequently, shows an example of a web page that may be used to collect beneficiary information.)

At 110, transfer information is collected. Transfer information may be gathered in response to a previous funding/payment entry indicating that the annuity being applied for is to be funded by transfer of funds from some other source. Thus, if an annuity is to be funded by transfer, information relating to the source of the transfer may be collected. The information collected may include, for example, the amount of money to transfer from the source, the type of the source (e.g., traditional IRA, Roth IRA, etc.), the name of the institution and account number in which the funds are being held, and any other information. (FIG. 5, which is discussed subsequently, shows an example of a web page that may be used to collect transfer information.)

Figure 6:
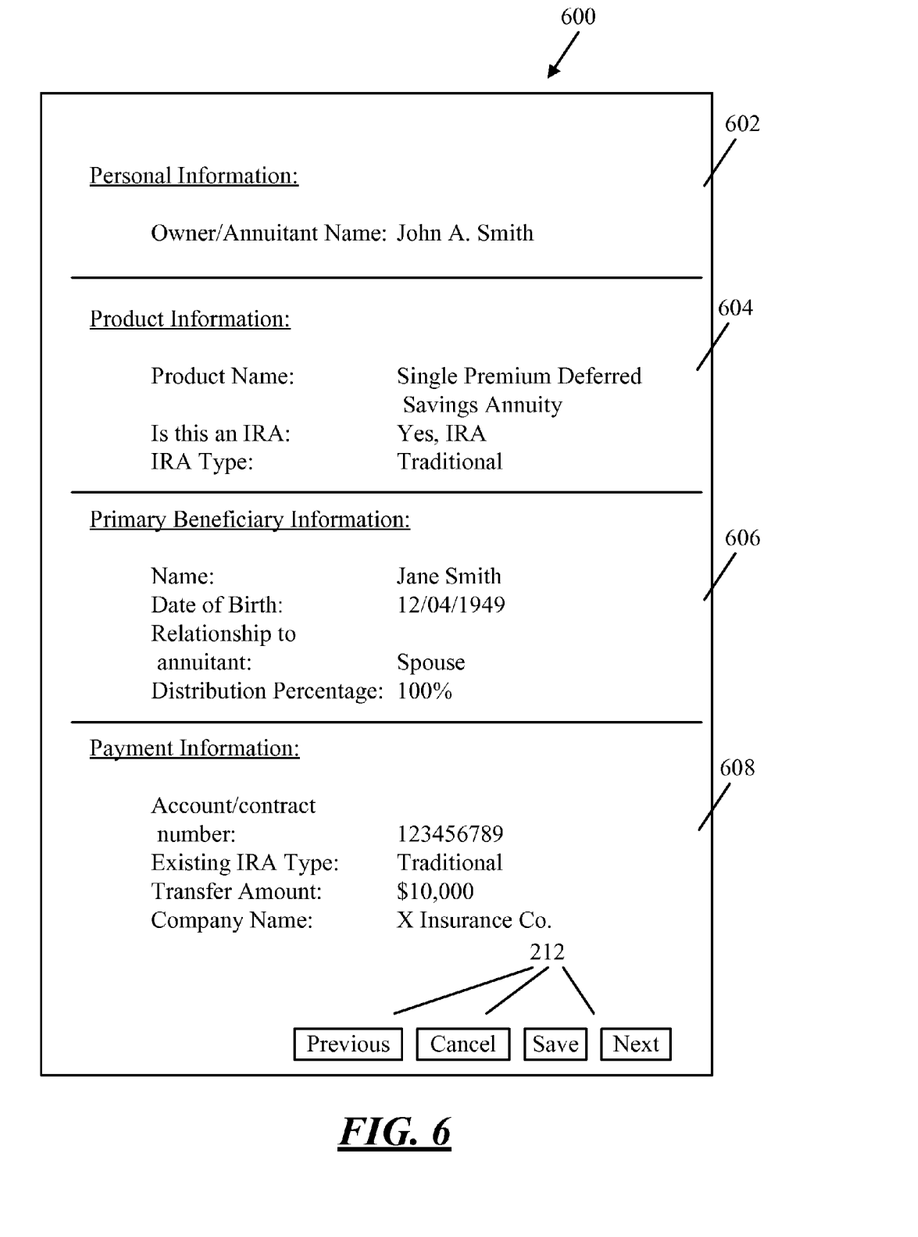

At 112, the applicant may be offered the chance to verify the selections that he or she has made. The applicant may also be given the chance to edit certain selections, and/or to return to earlier pages to re-enter certain information. An example of a web page that may be used to allow an applicant to verify selections is shown in FIG. 6, and is discussed subsequently.

Figure 7:
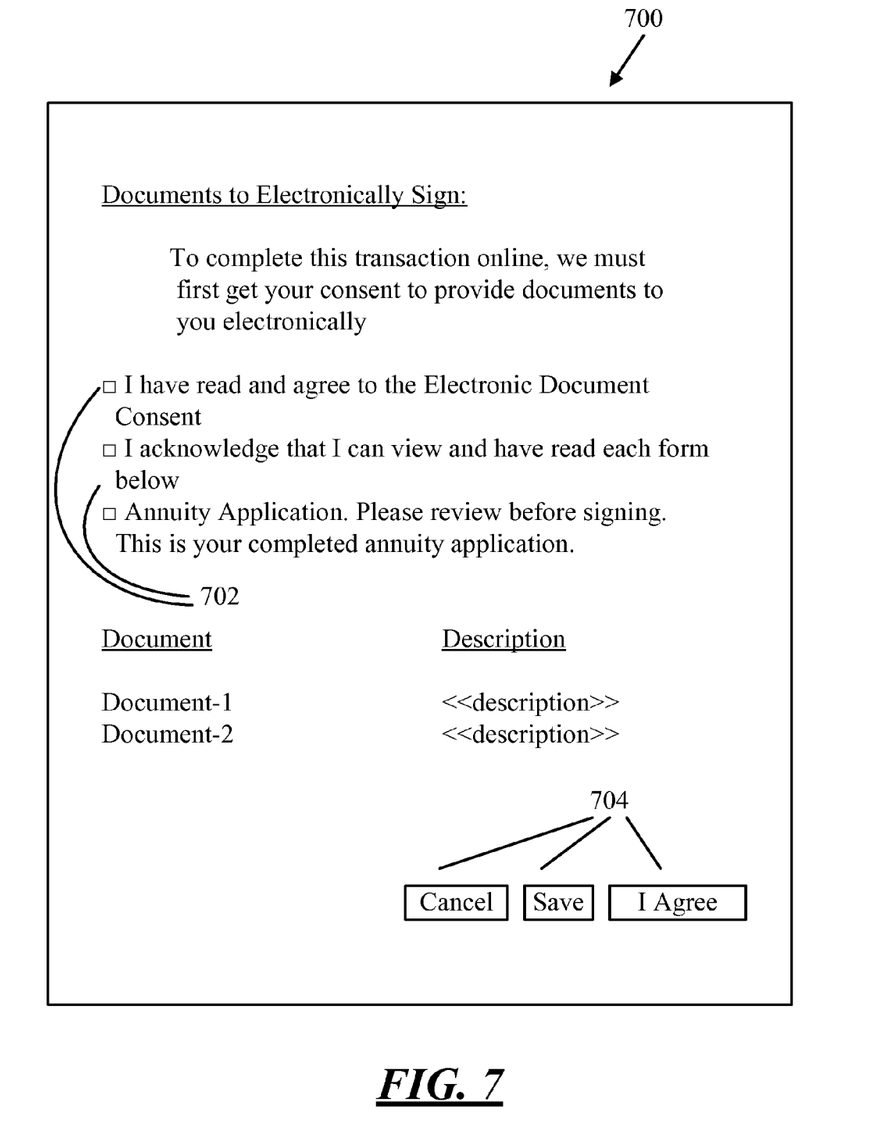

At 114, the applicant is given the chance to sign the application and/or other documents relating to the annuity. In some cases, the applicant may assent to the application, the terms of the annuity that would issue based on the application, and/or any other documents or contractual terms, using a "soft" form of assent such as an electronic signature. The applicant may be asked to review the documents, and the procedures for electronic acceptance, before an electronic signature would be accepted. The applicant may also be given the chance to use an ink ("wet") signature by printing out the documents and mailing them to an address. In some cases, a wet signature could be called for legally. In these cases, the applicant may be asked to print out the documents, sign them in ink, and mail them to an address without being given the chance to electronically sign the documents. (An example web page that may be used to offer the chance to electronically sign documents is shown in FIG. 7, which is discussed subsequently.)

Figure 8:
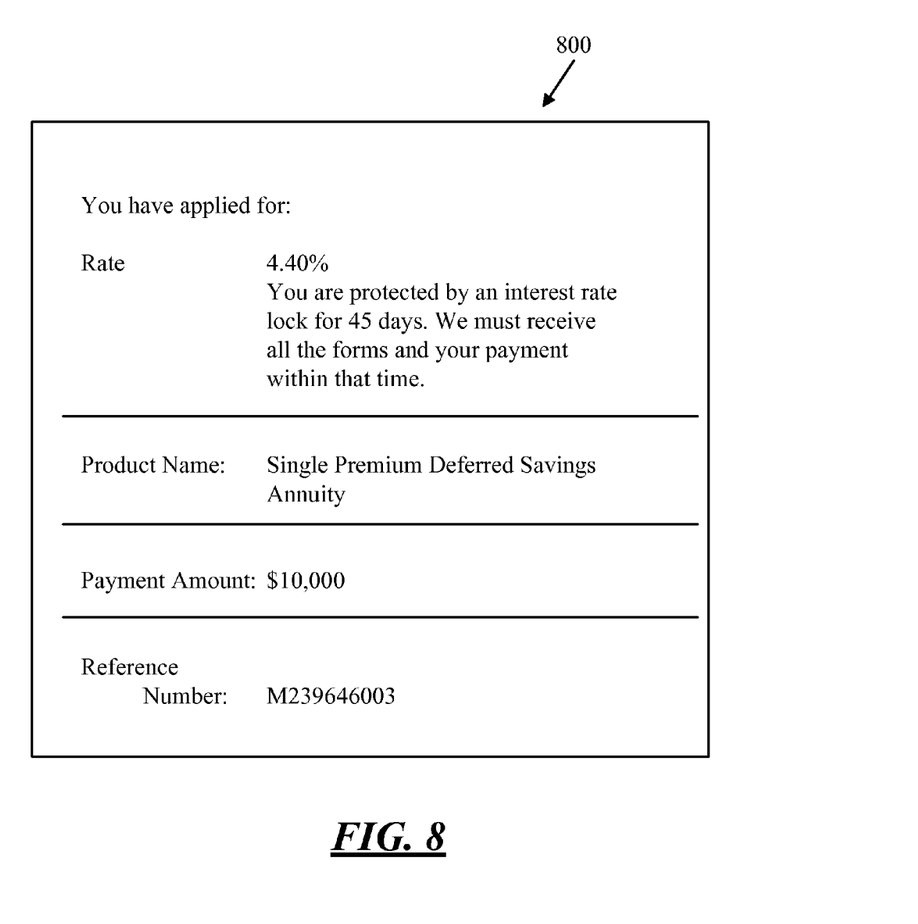

At 116, a confirmation of the application may be given to the applicant. For example, the applicant may be shown a page confirming the interest rate at which the annuity is to be issued, the name of the product, the payment amount, and/or any other information. (An example of a web page that may be used for confirmation is shown in FIG. 8, and is discussed subsequently.) It is noted that the annuity to be provided after application is to be made may be a tangible asset.

Figure 2:
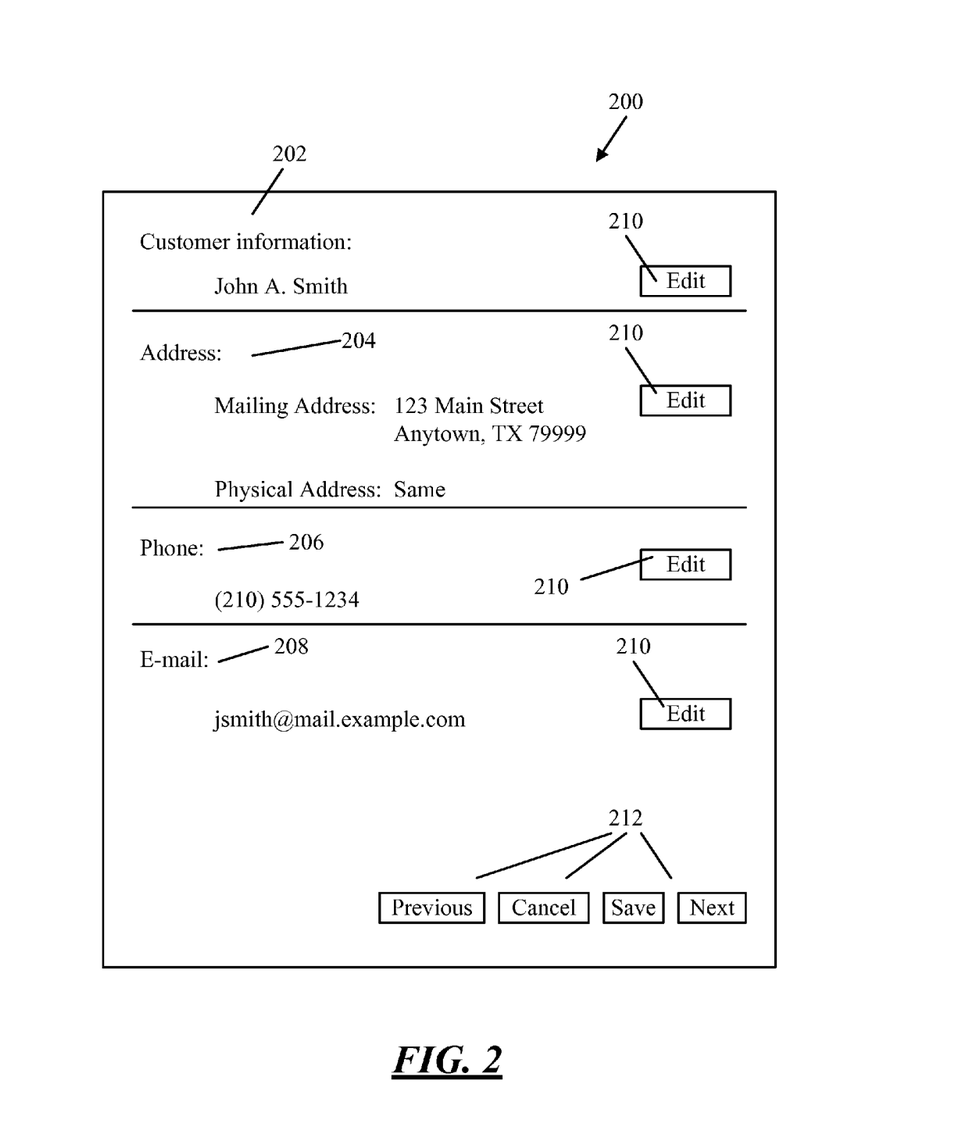
FIGS. 2-8 are block diagrams of example web pages that may be presented by a web application that allows a person to apply for an annuity.

FIG. 2 shows an example web page 200 that may be used by a web application to collect personal information relating to an annuity, or to an application for an annuity. Web page 200 may collect customer information 202, address information 204, telephone information 206, e-mail information 208, or any other information relating to the applicant for an annuity. If the applicant is already a customer of the financial institution at which the annuity is being applied for, then the applicant may already have logged in, and the web application may be able to retrieve the customer's information from a database. This information may be used to populate the various fields in web page 200. The applicant may be allowed to change the information, e.g., by using edit buttons 210. Web page 200 may also include navigation bar 212, which allow the applicant to move to the next or previous page, cancel the application process, or save a partially-completed application to be returned to later.

Figure 3:
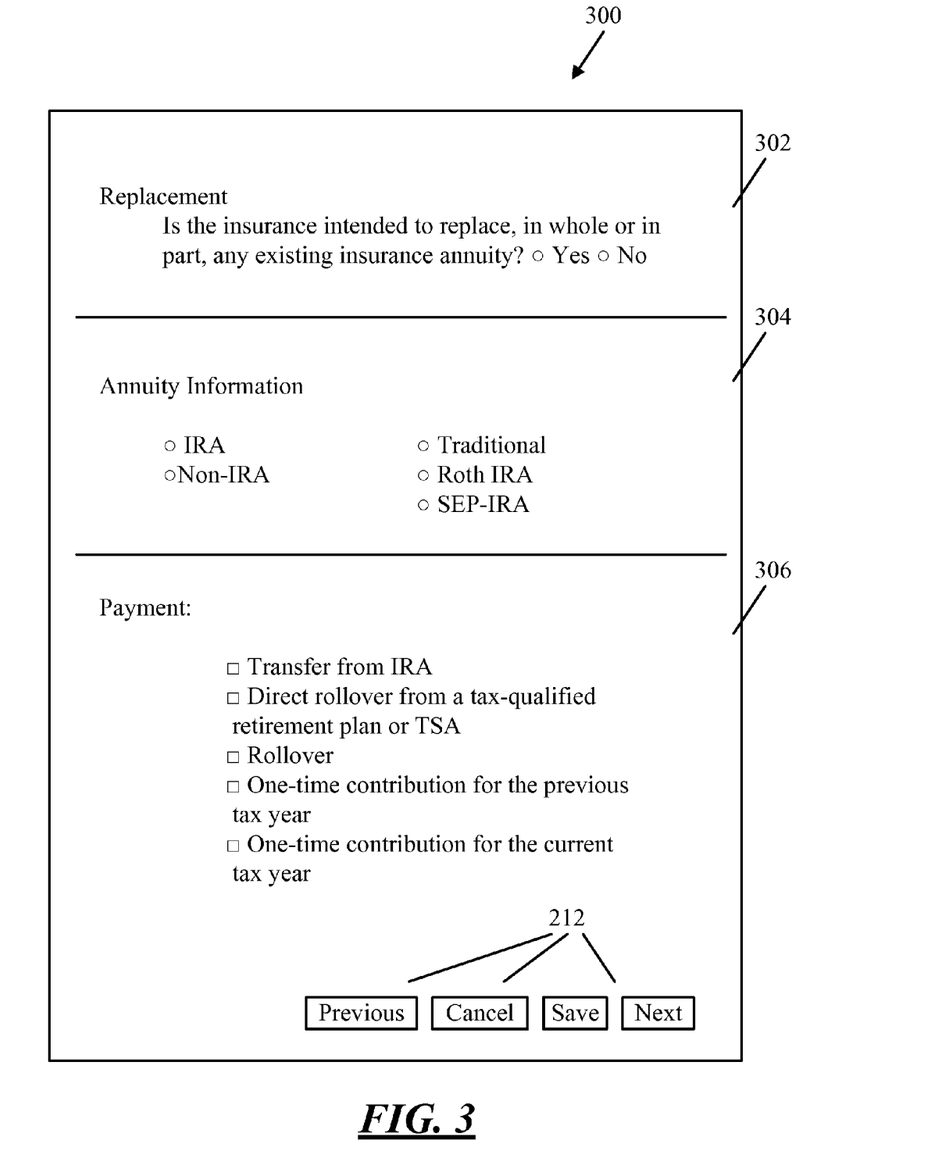

FIG. 3 shows an example web page 300 that a web application may use to collect annuity type information and/or payment information. For example, web page 300 may ask the applicant to indicate whether the annuity that is being applied for is a replacement of another annuity (at 302). The answer to this question may indication, for example, possible funding sources for the annuity (e.g., an IRA annuity may be funded by transfer from another IRA). Web page 300 may also ask the applicant to indicate (at 304) whether the annuity is for a retirement or non-retirement account (e.g., an IRA). The applicant may also be asked to choose what type of IRA the annuity is for, such as traditional Roth, or SEP-IRA. The applicant may also be asked (at 306) to indicate how payment will be made for the annuity. The set of choices available may differ depending on answers to other questions. For example, questions about what tax year the contribution relates to may not be relevant for a non-retirement account. Web page 300 may also include an instance of navigation bar 212, which is described previously.

Figure 4:
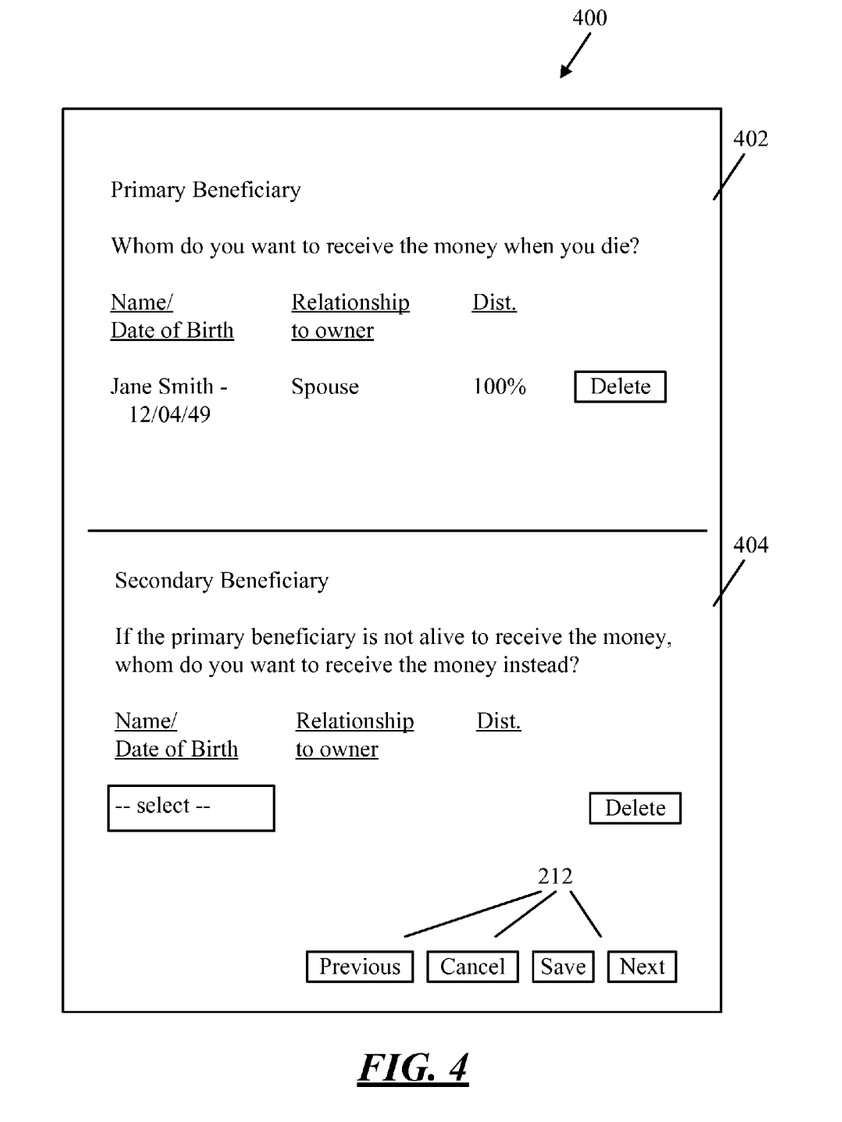

FIG. 4 shows an example web page 400 that a web application may use to collect beneficiary information. For example, an applicant may be asked to identify the primary beneficiary of the annuity (at 402). Information collected about the primary beneficiary may include, for example, the beneficiary's name, birthday, and relationship to the applicant. More than one primary beneficiary may be entered, and the applicant may be asked to enter the percentage of the annuity that is to be distributed to each beneficiary. If the applicant has an account with the financial institution at which the annuity is being applied for, then beneficiary information could be automatically populated from a database. For example, the web application might enter the applicant's spouse by default. (As previously noted, there may be various procedures to be followed in the event that the applicant attempts to make a spouse a non-beneficiary.) There may be a delete button that allows beneficiaries who were either previously-entered, or auto-populated, to be deleted from a beneficiary list. In addition to the primary beneficiary, identities of one or more secondary beneficiaries could also be entered (at 404). Web page 300 may also include an instance of navigation bar 212, which is described previously.

Figure 5:
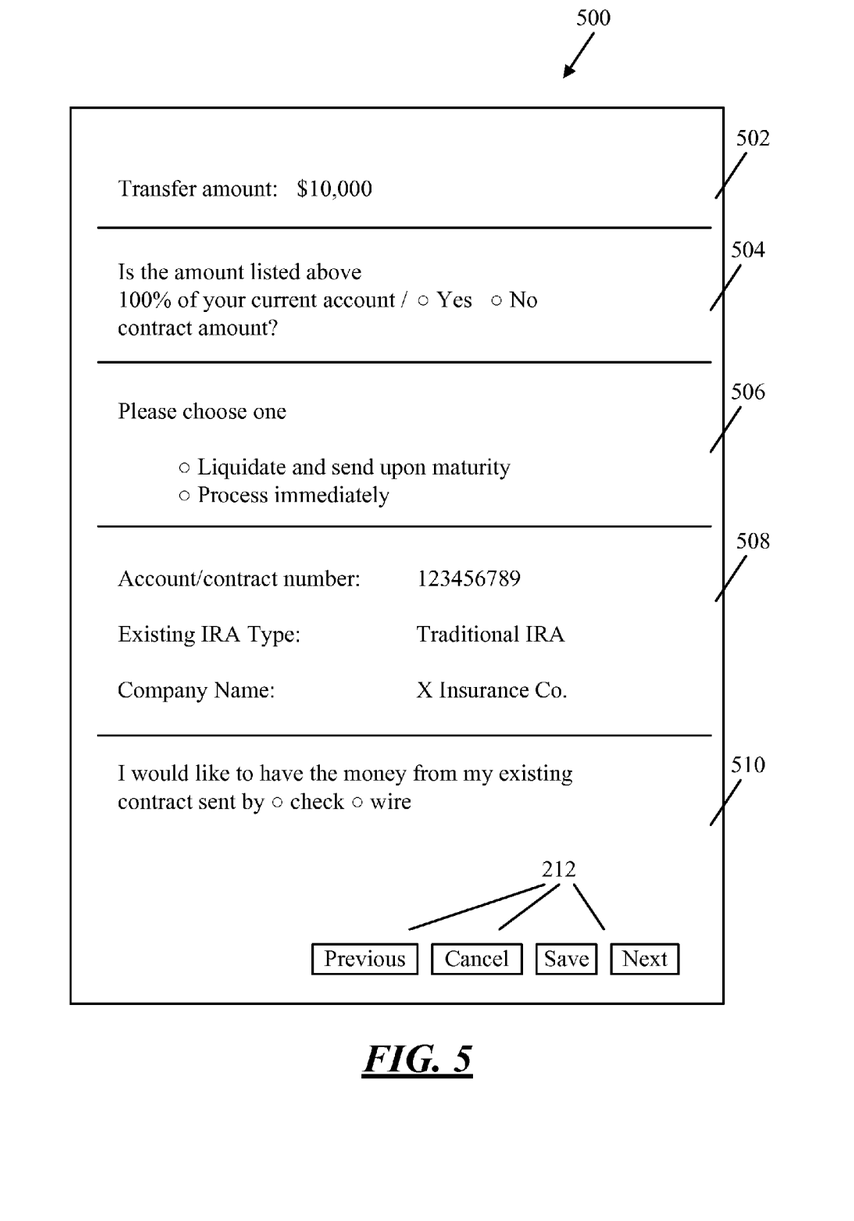

FIG. 5 shows an example web page 500 that a web application may use to collect transfer information. For example, web page 500 may specify the amount of money to be transferred (at 502), and may ask the applicant if that amount specified is the full value of the account from which the money is to be transferred (at 504). (If the amount is not the full amount, then the applicant could be asked what additional sources of funding would be used to make up the difference.) The applicant could also be asked (at 506) whether the funding source is to be liquidated immediately, or upon its normal maturity. The applicant may also be asked to enter details such as account number, institution name, etc., about the source of the transfer (at 508), and may be asked whether the transfer is to be made by check or wire (at 510). Transfers could be made using a clearinghouse (if the transfer is between institution), or could be made using internal processes if the transfer is between accounts maintained within the same financial institution. If two or more different sources of funding are used, then the web application could arrange for different transfers to be made in different ways. Web page 300 may also include an instance of navigation bar 212, which is described previously.

FIG. 6 shows an example web page 700 that a web application may use to verify information that has been entered. For example, web page 600 may present information such as personal information 602, product information 604, primary information 606, and payment information 608, which has been entered previously. The applicant could be given the opportunity on page 600 to edit some information that had been previously entered. Or, if the applicant wishes to change some of the information shown on page 600, the applicant could be asked to return to the appropriate page to enter the information, or to restart the application process. Web page 300 may also include an instance of navigation bar 212, which is described previously.

FIG. 7 shows an example of a web page 700 that a web application may use to ask an applicant to electronically sign documents. For example, web page 700 may ask the applicant to check various boxes 702 indicating that he or she has reviewed and agrees to certain documents or other conditions. Web page 300 may also provide links to documents that are to be reviewed and electronically signed, and may provide a description of these documents. Web page 300 could also provide an address to which an applicant may send documents that have been printed out and "wet" signed. Web page 300 may also include a set of buttons 704, which allows the applicant to cancel the transaction, save the transaction for later, or to accept the terms. In this example, clicking the "accept" button would constitute a form of electronic signature or soft assent.

FIG. 8 shows an example of a web page 800 that a web applicant may use to confirm the terms of the annuity applied for. For example, web page 800 may provide the interest rate of the annuity, how long the interest rate is locked for (e.g., that the quoted interested rate will expire after the elapse of some period of time), the name of the product applied for, the amount of the payment to be made, a reference number for the transaction, and/or any other information.

Any of the web pages described previously could provide a box that contains information about current interest rates. For example, the box might list different ranges of money that could be placed in an annuity, and the different interest rates that might apply to those ranges.

A web application may make the process of applying for annuities on-line relatively uniform, even if different annuities are supported by different back-end systems. For example, one type of annuity may be supported by a system that allows applications to be completed and accepted on-line, while another type of annuity may be supported by a legacy system that involves more human action and/or paper documents (e.g., a human agent could be given the information collected on a web site, and could use this information to fill out an application on paper, if the legacy system uses paper). The on-line annuity application process may make these differences in back-end support transparent to the applicant.

Figure 9:
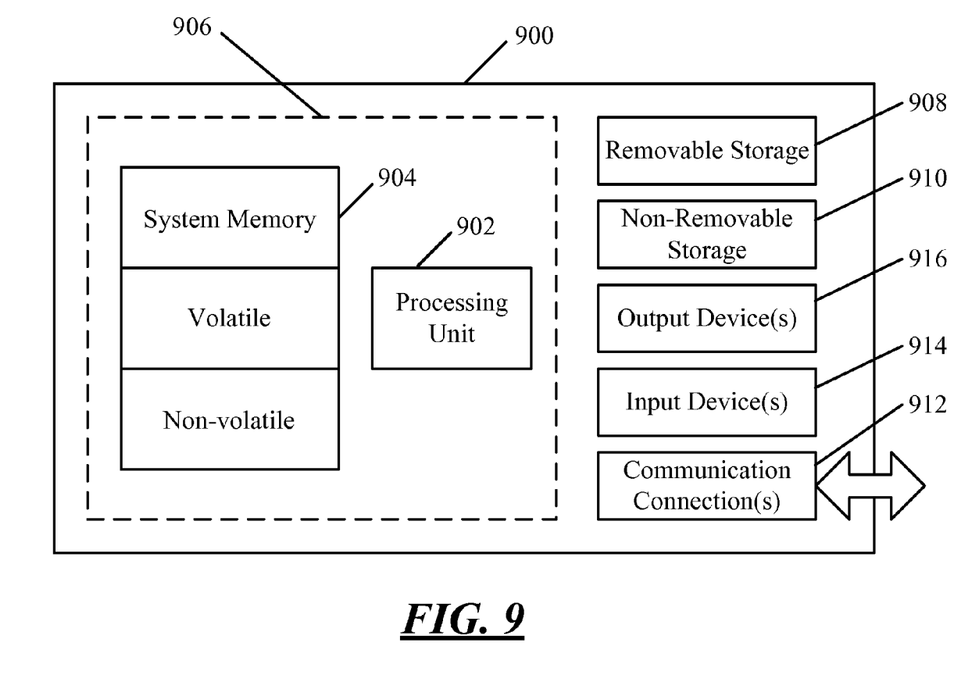
FIG. 9 is a block diagram of an example computing environment that may be used in connection with implementations of the subject matter described herein.

The subject matter described herein may be implemented through the use of a computer system, or other type of device that has some computing mechanism(s). FIG. 9 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an example system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by computing device 900 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 904, removable storage 908, and non-removable storage 910 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 900 may also have input device(s) 914 such as keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts previously described. Rather, the specific features and acts previously described are disclosed as example forms of implementing the claims.

The invention claimed is:

1. A system for providing annuities, the system comprising:
   a memory device that stores information about a plurality of distinct annuity types supported by at least two different back-end systems of a financial institution; and
   a processor, associated with at least one subsystem and coupled to said memory device, that:
   offers, to a customer through a web application useable by the customer, an opportunity to purchase a first type of annuity of the plurality of distinct annuity types and a second type of annuity of the plurality of distinct annuity types, wherein the first type of annuity is a retirement type annuity and the second type of annuity is a non-retirement type of annuity;
   obtains, from said customer through said web application, a choice of annuity type, wherein the choice of annuity type indicates whether said customer wishes to purchase said first type of annuity or said second type of annuity;
   collects application information for an annuity application for an annuity from said customer, through said web application, in a manner that is:
   a) independent of the back-end systems of the financial institution to receive said annuity application; and
   b) based on the choice of annuity type, wherein said application information includes information related to a beneficiary of said annuity who is not said customer's spouse;
   selecting one of the back-end systems of the financial institution to process the annuity application based on the choice of the annuity type indicated by the customer;

determines that said customer is a resident of a jurisdiction in which law calls for said customer's spouse to consent to not being a beneficiary of the annuity; and obtains said spouse's consent to not being a beneficiary of the annuity.

2. The system of claim 1, wherein a first back-end system of the back-end systems of the financial institution allows said annuity application to be processed electronically and wherein a second back-end system of the back-end systems of the financial institution processes said annuity application on paper, wherein said choice is for said second type of annuity, the system further comprising at least one subsystem associated with a processor that:

provides said annuity application to an agent of the financial institution to process a paper annuity application.

3. The system of claim 1, further comprising at least one subsystem associated with a processor that:

collects, through said web application, an indication of a source from which said annuity is to be funded; and obtains funding from said source.

4. The system of claim 1, further comprising at least one subsystem associated with a processor that:

obtains funding for said annuity from at least two separate financial institutions, one of which is an issuer of said annuity.

5. The system of claim 1, further comprising at least one subsystem associated with a processor that:

collects, from said customer, an indication of whether said annuity is to replace an existing annuity; and offers to said customer a choice of funding sources for said annuity, wherein the choice that is offered is based on said indication.

6. A processor-implemented method of providing annuities, the method comprising:

providing one or more processors running a web application;

offering, by a processor, to a customer through the web application useable by the customer, an opportunity to purchase a first type of annuity of a plurality of distinct annuity types and a second type of annuity of the plurality of distinct annuity types, wherein the first type of annuity is a retirement type annuity and the second type of annuity is a non-retirement type of annuity, and wherein the plurality of distinct annuity types are supported by at least two different back-end systems of a financial institution;

obtaining, by a processor, from said customer through said web application, a choice of annuity type, wherein the choice of annuity type indicates whether said customer wishes to purchase said first type of annuity or said second type of annuity;

collecting, by a processor, application information for an annuity application for an annuity from said customer, through said web application, in a manner that is:

a) independent of the back-end systems of the financial institution to receive said annuity application; and b) based on the choice of annuity type, wherein said application information includes information related to a beneficiary of said annuity who is not said customer's spouse;

selecting one of the back-end systems of the financial institution to process the annuity application based on the choice of the annuity type indicated by the customer;

determining that said customer is a resident of a jurisdiction in which law calls for said customer's spouse to consent to not being a beneficiary of the annuity; and obtaining said spouse's consent to not being a beneficiary of the annuity.

7. The method of claim 6, wherein a first back-end system of the back-end systems of the financial institution allows said annuity application to be processed electronically and wherein a second back-end system of the back-end systems of the financial institution processes said annuity application on paper, wherein said choice is for said second type of annuity, and wherein the method further comprises:

providing said annuity application to an agent of the financial institution to process a paper annuity application.

8. The method of claim 6, further comprising:

collecting, through said web application, an indication of a source from which said annuity is to be funded; and obtaining funding from said source.

9. The method of claim 6, further comprising:

obtaining funding for said annuity from at least two separate financial institutions, one of which is an issuer of said annuity.

10. The method of claim 6, further comprising:

collecting, from said customer, an indication of whether said annuity is to replace an existing annuity; and offering to said customer a choice of funding sources for said annuity, wherein the choice that is offered is based on said indication.

11. A non-transitory computer-readable storage medium storing computer-readable instructions for providing annuities, the computer-readable instructions comprising:

instructions that offer, to a customer through the web application useable by the customer, an opportunity to purchase a first type of annuity of a plurality of distinct annuity types and a second type of annuity of the plurality of distinct annuity types, wherein the first type of annuity is a retirement type annuity and the second type of annuity is a non-retirement type of annuity, wherein the plurality of distinct annuity types are supported by at least two different back-end systems of a financial institution;

instructions that obtain, from said customer through said web application, a choice of annuity type, wherein the choice of annuity type indicates whether said customer wishes to purchase said first type of annuity or said second type of annuity;

instructions that collect application information for an annuity application for an annuity from said customer, through said web application, in a manner that is:

a) independent of the back-end systems of the financial institution to receive said annuity application; and b) based on the choice of annuity type, wherein said application information includes information related to a beneficiary of said annuity who is not said customer's spouse;

instructions that select one of the back-end systems of the financial institution to process the annuity application based on the choice of the annuity type indicated by the customer;

instructions that determine that said customer is a resident of a jurisdiction in which law calls for said customer's spouse to consent to not being a beneficiary of the annuity; and instructions that obtain said spouse's consent to not being a beneficiary of the annuity.

12. The non-transitory computer-readable storage medium of claim 11, wherein a first back-end system of the back-end systems of the financial institution allows said annuity application to be processed electronically and wherein said second back-end system of the back-end systems of the financial institution processes said annuity application on paper, wherein said choice is for said second type of annuity, wherein the computer-readable instructions further comprise:

instructions that provide said annuity application to an agent of the financial institution to process a paper annuity application.

13. The non-transitory computer-readable storage medium of claim 11, wherein the computer-readable instructions further comprise:

instructions that collect, through said web application, an indication of a source from which said annuity is to be funded; and instructions that obtain funding from said source.

14. The non-transitory computer-readable storage medium of claim 11, wherein the computer-readable instructions further comprise:

instructions that obtain funding for said annuity from at least two separate financial institutions, one of which is an issuer of said annuity.

15. The non-transitory computer-readable storage medium of claim 11, wherein the computer-readable instructions further comprise:

instructions that collect, from said customer, an indication of whether said annuity is to replace an existing annuity; and instructions that offer to said customer a choice of funding sources for said annuity, wherein the choice that is offered is based on said indication.

16. The system of claim 1, wherein said application information includes a funding source for said annuity and an account number of said funding source.

17. The method of claim 6, wherein said application information includes a funding source for said annuity and an account number of said funding source.

18. The non-transitory computer-readable storage medium of claim 11, wherein said application information includes a funding source for said annuity and an account number of said funding source.

* * * * *